US006801332B1

(12) United States Patent
Suga et al.

(10) Patent No.: US 6,801,332 B1
(45) Date of Patent: Oct. 5, 2004

(54) COMPOSITE APPARATUS AND PRINTER SHARING METHOD

(75) Inventors: Daisuke Suga, Toride (JP); Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/571,152

(22) Filed: May 16, 2000

(30) Foreign Application Priority Data

May 18, 1999 (JP) ........................................ 11-137095

(51) Int. Cl.[7] ............................................. G06F 15/00
(52) U.S. Cl. ..................................... 358/1.15; 358/468
(58) Field of Search ........................ 395/112; 358/1.15, 358/1.9, 426.01–426.12, 434–435, 437, 468

(56) References Cited

U.S. PATENT DOCUMENTS

| 5,668,642 A | 9/1997 | Yoshida ...................... 358/437 |
| 5,724,555 A | 3/1998 | Wadsworth ................. 395/500 |
| 6,023,559 A * | 2/2000 | Kohtani et al. ............ 358/1.13 |

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

A composite apparatus and a printer sharing method are provided which can use an already developed printer board and suppress an increase in product cost. If a print permission signal is true, a selector of a main controller is switched to receive a signal from a printer board. The main controller controls to which one of a printer interface of the main controller and a printer interface of the printer board a signal is transferred from the selector. Namely, when a relay receives a PRNT signal, this effect is notified to the main controller's CPU via a CPU bus, and the CPU sends a control signal to the selector via the printer interface of the main controller and a signal line. In response to this, the selector is switched to the printer board side to thereafter transfer signals from the printer board to printer to perform a print process. After the print process, the CPU sends a selector control signal to the selector via the printer interface of the main controller so that the selector is recovered to the main controller side.

8 Claims, 4 Drawing Sheets

COMPOSITE APPARATUS AND PRINTER SHARING METHOD

BACKGROUND OF THE INVENTION

1. Field of the Invention

The present invention relates to a composite apparatus having a plurality of functions such as a printer function, a copy function and a facsimile function and a printer sharing method.

2. Related Background Art

The number of composite apparatuses is increasing nowadays. A composite apparatus has a plurality of functions including a digital copy function, a facsimile function and the like, and in addition a printer function for using the apparatus as a printer for an externally connected computer.

Most of composite apparatuses have the structure that a new function different from fundamental functions is added by mounting an option board for the new function on the composite apparatus.

A relation between a conventional composite apparatus and an option board with a printer function is illustrated in FIG. 3. The option board 2 having a printer function for the composite apparatus has a CPU bus which is a connection interface with a main controller 1 of the composite apparatus. The option board 2 is connected to the main controller 1 by the CPU bus via a relay IC 109 for data transfer therebetween. More specifically, page description language (PDL) data received from a computer 120 is analyzed by a printer controller 124 and developed in to a raster image which is input via a printer I/F 114 to the main controller 1 of the composite apparatus and stored in a RAM 122. CPU 108 checks whether a FAX job or a copy job is using a printer engine 4. If the printer engine 4 is being used, an operation stands by, whereas if the printer is not used, the raster image stored in RAM 122 is transferred via a printer I/F 118 to an engine controller 3 to print it out. If the printer engine is executing another job, the raster image may not be developed in RAM 122 but a busy is notified to the printer I/F 114 to make the development process stand by. In both cases, the printer board 2 cannot use a printer board for a general printer.

The conventional composite apparatus has the following problems. First, since the interface with the main controller is connected by the CPU bus, an already developed printer board for a general printer cannot be used. This is because the option board with the printer function and an already developed printer board for a general printer have different interface specifications and the already developed printer board has an interface capable of being directly connected to the printer engine.

Second, the printer board developed for a general printer exchanges various printer statuses to and from the printer engine, whereas the printer engine of a composite apparatus has far more statuses. Therefore, there is some mismatch between the status analyzed by the printer board and the status notified by the printer engine.

The printer board of a conventional composite apparatus is therefore required to determine an output destination of an output interface of a video signal and to modify a status notice from a connection interface with the main controller. Although both the option board and a general printer board have similar functions, hardware is required to design again, which takes some works and increases the product cost.

SUMMARY OF THE INVENTION

The present invention has been made in order to solve the above problems. It is an object of the invention to provide a composite apparatus and a printer sharing method capable of using an already developed printer board and suppressing an increase in product cost, and to provide a storage medium storing a program for realizing such a method.

In order to achieve the above object, the invention provides a composite apparatus having a plurality of functions including a print function and being connectable to a printer board developed for a general printer and connectable to an external computer, the composite apparatus comprising control means for controlling an entirety of the composite apparatus and print control means for controlling print means which prints image data supplied from the external computer via the printer board or image data supplied from the control means. The composite apparatus comprises selector means provided between the print control means and the printer board for selecting a signal path from the printer board to the print control means and relay means for relaying some of signals to be transferred from the printer board to the print control means, wherein the selector means changes the signal path so that when image data supplied from the printer board via the external computer is printed, predetermined high speed signals output from the printer board are directly received and output to the print control means, and signals other than the predetermined high speed signals output from the printer board are received via the relay means and output to the print control means, and when image data supplied from the control means is printed, the predetermined high speed signals and the signals other than the predetermined high speed signals output from the control means are supplied to the print control means.

Other features and advantages of the present invention will become apparent from the following description taken in conjunction with the accompanying drawings.

DETAILED DESCRIPTION OF THE PREFERRED EMBODIMENTS

An embodiment of the invention will be described with reference to the accompanying drawings.

Figure 1:
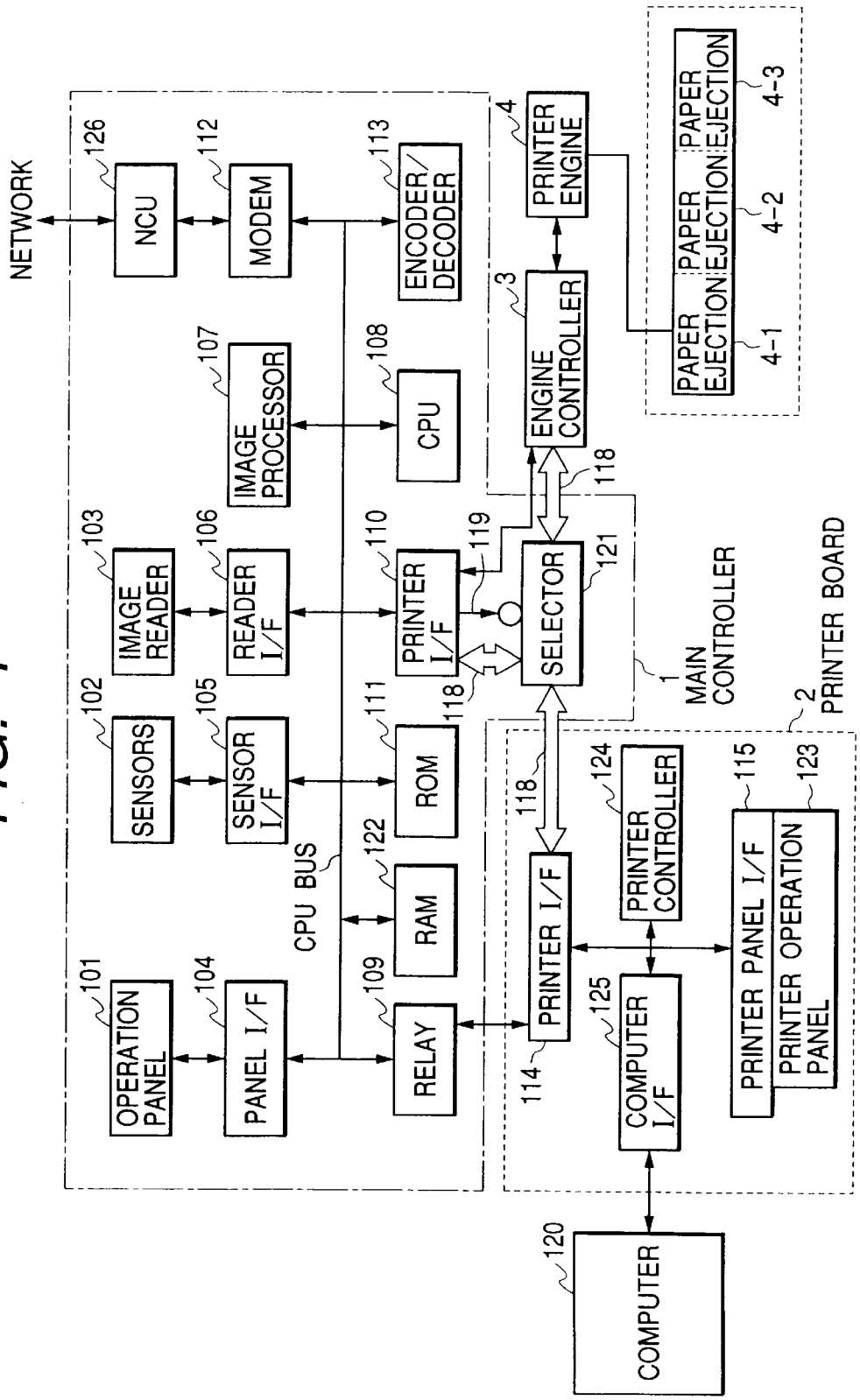
FIG. 1 is a block diagram showing the outline structure of a composite apparatus according to an embodiment of the invention.

FIG. 1 is a block diagram showing the outline structure of a composite apparatus according to an embodiment. In this embodiment, the composite apparatus has a laser beam printer (LBP) as its printer. The composite apparatus has a digital copy function and a facsimile function as its fundamental functions, and a printer function as its optional function by adding a printer expansion board.

The composite apparatus shown in FIG. 1 is mainly constituted of: a main controller 1 for controlling the entirety of the composite apparatus; a printer board 2 connected to an external computer 120; a printer engine 4 for executing a print process; and an engine controller 3 for controlling the printer engine 4 in accordance with a command from the main controller 1. The printer engine 4 and engine controller 3 constituting an LBP. Blocks of the composite apparatus shown in FIG. 1 are interconnected by a signal line 118 of a selector 121 of the main controller 1 for data transfer to and from these blocks.

The main controller 1 has: in addition to the selector 121, a panel interface (I/F) 104 with an operation panel 101; a sensor I/F 105 with various sensors 102 in the composite apparatus; an image reader interface 106 with an image reader 103; an image processor 107 for processing image data read with the image reader 103 or sent from the computer 120; a modem 112 for controlling an network control unit (NCU) 126 connected to a public telephone line; an encoder/decoder (codec) 113 for encoding and decoding data transferred to and from the modem 112; a relay IC 109 for relaying signals between the printer board 2 and a CPU 108 to be described later; a RAM 122 to be used as a working area or the like of CPU 108; a ROM 111 for storing various programs to be executed by CPU 108; and a printer I/F 110 with the engine controller 3. The I/F 104 to 106 and 110, image processor 107, modem 112, relay IC 109, RAM 122, ROM 111, and codec 113 are connected to CPU 108 by a CPU bus and controlled by CPU 108.

CPU 108 periodically monitors the operation panel I/F 104. As the operation panel 101 is operated, information or the like of a depressed key is supplied from the panel I/F 104 to CPU 108. By operating the operation panel 101, a user can instruct an operation of a copy function, a facsimile function or the like and can set each of various operation modes.

The printer board 2 is mainly constituted of: a printer I/F 114 with the relay IC 109, a computer I/F 125 with the computer 120; a printer controller 124 for collectively controlling the printer; and a printer panel I/F 115 with a printer operation panel 123.

The printer controller 124 periodically monitors the printer panel I/F 115. As the printer panel 123 is operated, information of a depressed key is supplied from the printer panel I/F 123 to the printer controller 124. By operating the printer operation panel 123, each of various operation modes of the printer function can be set, such as switching between an on-line mode and an off-line mode, setting a record sheet size, and setting a record sheet feed port. Various status information and the like are displayed on the printer operation panel 123.

The computer I/F 125 with the external computer 120 may be a parallel port, a serial port, 10BASE-T, 10BASE2, 100BASE-TX or the like. Data transfer between the computer 120 and computer I/F 125 of the printer board 2 will not be described because this is not relevant to the present invention.

The printer engine 4 performs a print process in accordance with an image signal received from the engine controller 3. Specifically, the printer engine 4 records an image on a record sheet and ejects the record sheet to one of paper ejection ports 4-1, 4-2 and 4-3 of the composite apparatus 1. One of the three paper ejection ports 4-1, 4-2 and 4-3 is selected to eject record sheets, in accordance with the jobs including a facsimile print from NCU 126, a copy print from the reader 103, and a remote print from the printer board 2. This selection can be performed by using the operation panel 101.

By using the operation panel 101, an "individual setting" can be performed to assign the paper ejection port 4-1 to the facsimile print, the paper ejection port 4-2 to the copy print, and the paper ejection port 4-3 to the remote print. By using the operation panel 101, a "sharing setting" can also be performed to share all the paper ejection ports 4-1 to 4-3 and assign each job to any one of the paper ejection ports 4-1 to 4-3. The set contents are stored in RAM 122. Each paper ejection port has a full state detection function for detecting a full state of record sheets in the paper ejection port.

The printer engine 4 notifies each of various statuses of the print process to CPU 108 via the engine controller 3.

In the composite apparatus constructed as above, as print data is supplied from the externally connected computer 120, this print data is stored in a buffer (not shown) of the printer board 2. The print data is assumed to be written in page description language. The stored print data is developed by the printer controller 124 into a raster image having a data format suitable for printing, and stored in the buffer. After the data development, a print process starts.

As the printer, an LBP is used which can process binary data at a resolution of 600×600 dpi (dot per inch). In a binary data printer, an image is dissolved into a number of dots. A dot to be printed has a pixel value "1", whereas a dot not to be printed has a pixel value "0". The developed image data is transferred to the engine controller 3 which controls various motors of the printer engine 4 and performs a development process, a fixing process, a laser beam control to thereby print a desired image on a record sheet.

Figure 4:
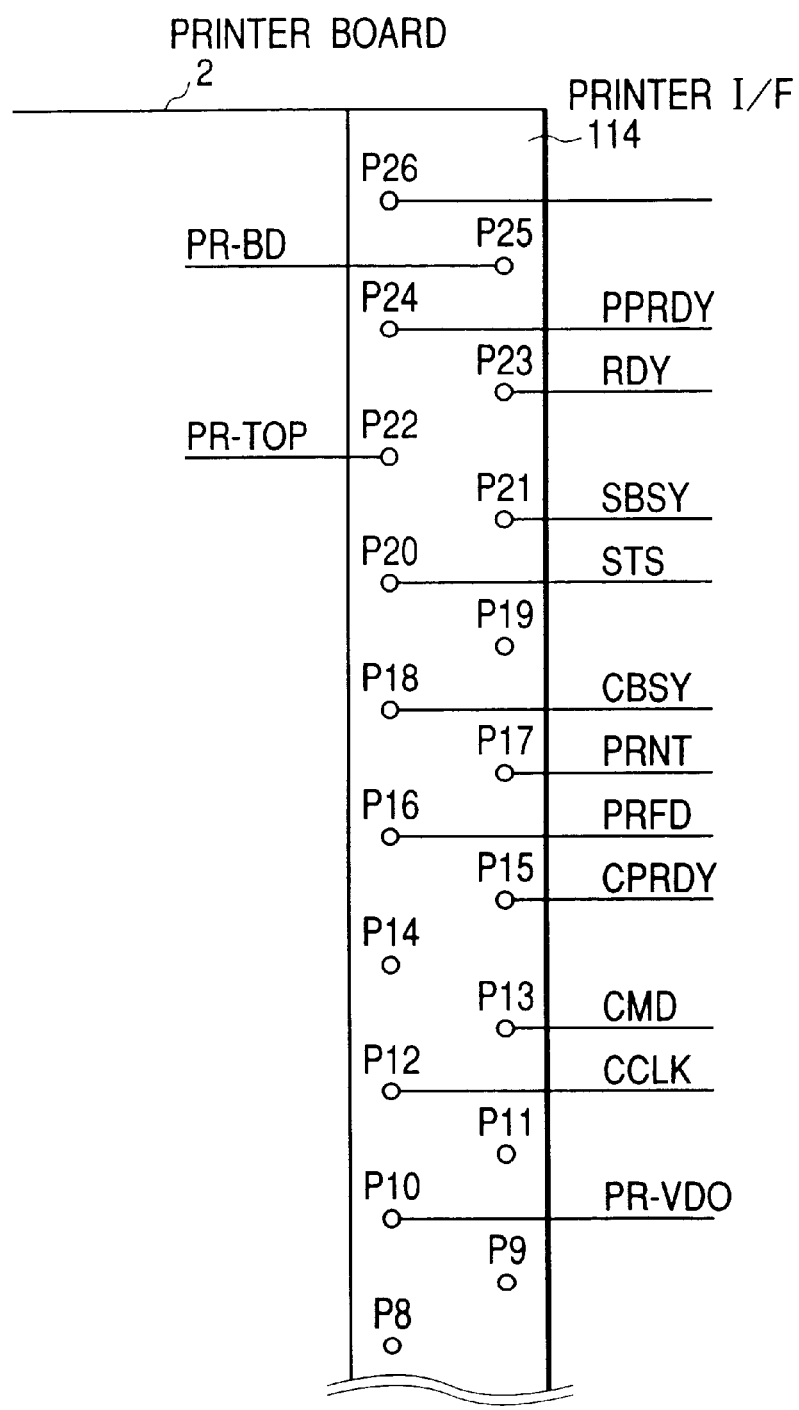
FIG. 4 is a diagram illustrating pins of a printer I/F.

With reference to FIG. 4, the structure of pins of the printer I/F 114 of the printer board 2 will be described. Generally, the printer I/F 114 of the printer board 2 has 26 pins. The description of those pins for voltage sources and ground is omitted. P10 represents a print video signal which is serially output. P12 represents a command clock indicating a timing when a command is output. P13 represents a command signal made of serial 8 bits. P15 represents a controller power ready signal indicating that a power is being supplied to the printer board 2. P16 represents a pre-feed signal for pre-feeding a record sheet. P17 represents a print signal to be supplied from the relay IC 109 and indicating a print permission. P18 represents a command busy signal to be supplied from the relay IC 109 indicating that a transfer of a command is not permitted because of a busy state if this signal takes an H level. P20 represents a status signal made of serial 8 bits. P21 represents a status busy signal to be supplied from the relay IC 109 indicating that a transfer of a status is not permitted because of a busy state if this signal takes an H level. P22 represents a vertical sync signal indicating a record timing of an image signal. P23 represents a ready signal, and P24 represents a printer power ready signal. P25 represents a horizontal sync signal indicating a record timing of an image signal. P11, P14 and P26 represent ground terminals.

The pins of the printer I/F 114 of the printer board 2 have the structure described above. Of these pins, the pins P10, P22, and P25 use high speed signals: an image signal, a vertical sync signal and a horizontal sync signal, respectively. The remaining pins use low speed signals.

In the main controller 1 of the composite apparatus, an image signal is directly supplied to the printer engine without using the CPU bus of the main controller 1 in order to print at high speed a print job supplied from the printer board 2. With this arrangement, a high speed print becomes possible. In order to avoid any conflict with a copy job and a fax job, the main controller of the composite apparatus executes an access control for the printer engine. To this end, a control signal from the printer board is supplied via the CPU bus to the main controller 1.

Transfer of a control signal between the printer I/F 114 of the printer board 2 and the relay IC 109 of the main controller, which is an important feature of the invention, will be described first.

First, the printer I/F 114 of the printer board 2 supplies the relay IC 109 with a command or control signal similar to that to be output from the engine controller 116. This command is supplied from the relay IC 109 to CPU 108 via the CPU bus. CPU 108 analyzes the control signal and supplies the analyzed results to the printer I/F 110 of the main controller 1. The printer I/F 110 transfers the analyzed results to the engine controller 4. The engine controller 4 supplies a status answer signal to the printer I/F 110 in accordance with the state of the printer engine 117. The printer interface 110 returns the status of the answer signal to CPU 108. CPU 108 analyzes the received status, and if necessary converts the status into a status capable of being analyzed by the printer board 2 and returns it to the relay IC 109. The relay IC 109 transfers the received status answer signal to the printer I/F 114 of the printer board 2.

Upon reception of the status answer signal responding to the command control signal returned via the signal route described above, the printer board 2 operates as if the status answer signal responding to the command control signal is received directly from the engine controller 3.

Figure 2:
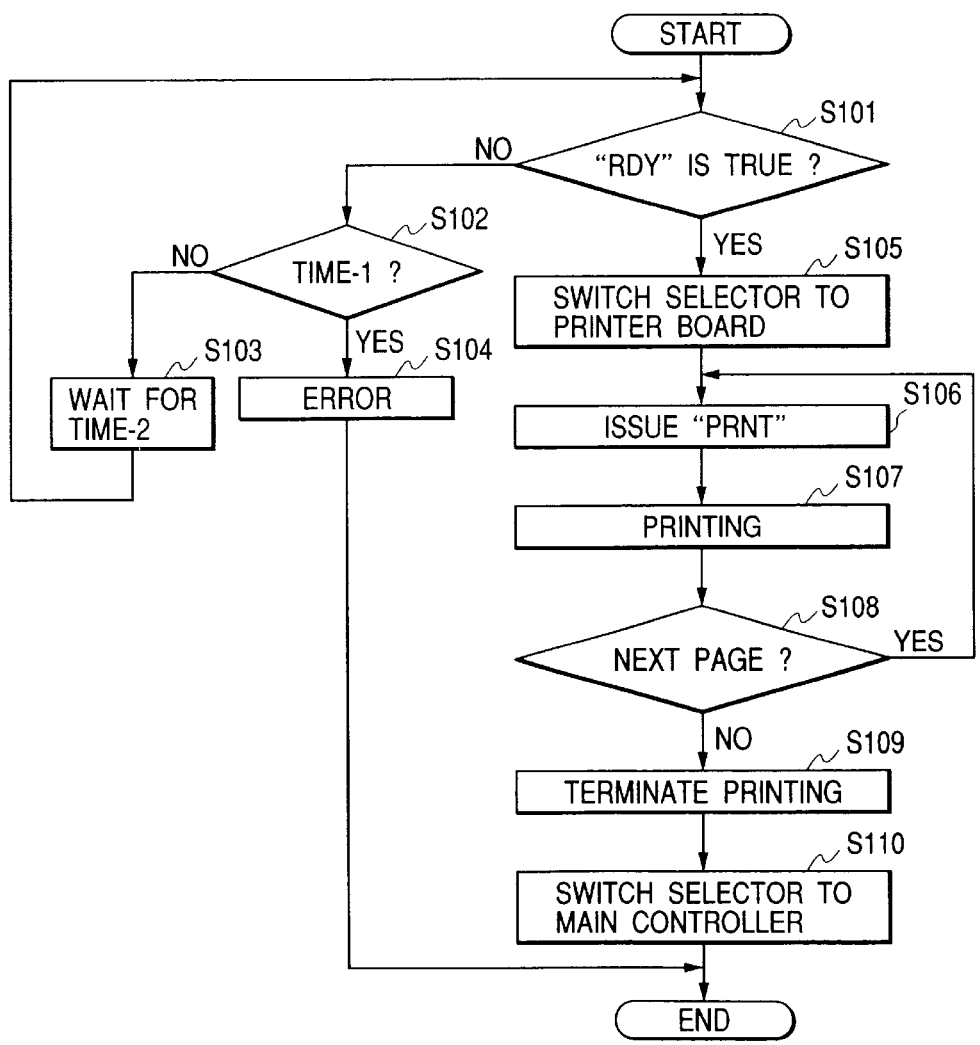
FIG. 2 is a flow chart illustrating a print process to be executed when image data sent from an externally connected computer 120 is printed.
Figure 3:
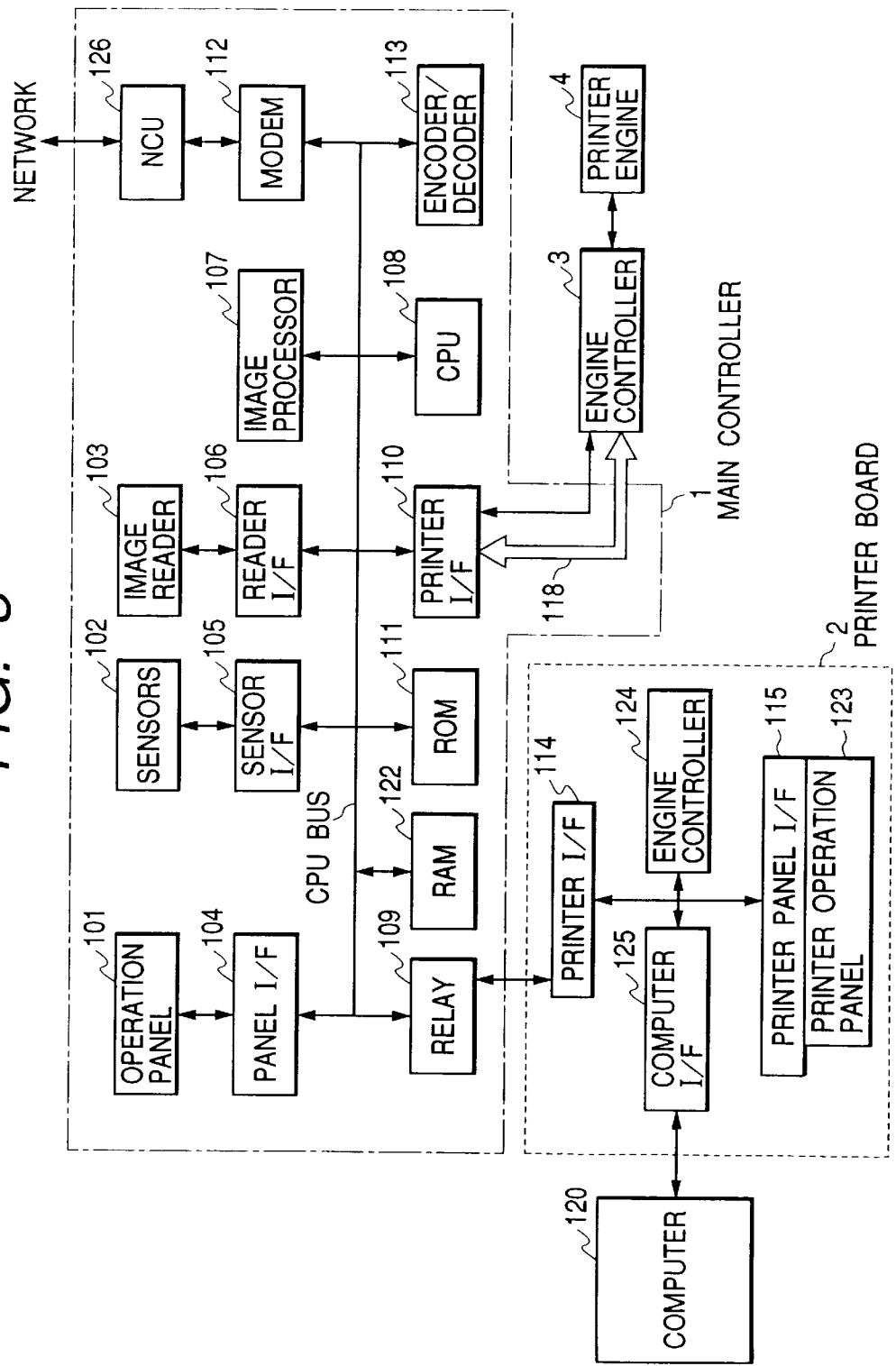
FIG. 3 is a block diagram illustrating a conventional composite apparatus and an option board with a printer function.

FIG. 2 is a flow chart illustrating the print process to be executed when image data supplied from the externally connected computer 120 is printed.

When the printer I/F 114 of the printer board 2 acquires a print permission signal (hereinafter called a "RDY signal") from the relay IC 109 in the manner described above, it is checked whether the RDY signal is true or false, to judge whether the printer engine can be used or not (step S101). If the RDY signal is false, i.e., if the printer engine can be used, it is checked whether a first predetermined time TIME-1 lapsed (step S102). If not lapsed, the operation stands by for a second predetermined time TIME-2 (step S103), and thereafter the RDY signal is again acquired to repeat steps S101 to S103. If the judgement at step S102 indicates that the first predetermined time TIME-1 lapsed, i.e., if the RDY signal maintains false during the first predetermined time TIME-1, an error process is executed (step S104) to terminate the print process.

Instead of checking whether the RDY signal is true or false, the main controller 1 may supply a false signal indicating whether the printer engine can not be used, to the printer board 2, during the period while the printer engine cannot be used.

If the RDY signal is true at step S101, the selector 121 is switched so that it can receive a signal from the printer board 2 (step 105). More specifically, if the RDY signal is true, the printer I/F 114 of the printer board 2 supplies the relay IC 109 with a command representative of necessary print information such as a record sheet size and a record sheet feed port. This command is supplied from the printer I/F 114 to the relay IC 109 via the above-described signal path. A status is thereafter returned from the relay IC 109 to the printer I/F 114 via the signal route described earlier. Upon reception of this status, the printer I/F 114 sends a print start signal (hereinafter called a "PRNT signal") to the relay IC 109.

Three signals having severe timings and transferred via the signal lines 118 at high speed during the LBP operation include the vertical sync signal, horizontal sync signal and image signal. These high speed signals are transferred from the engine controller 3 to the printer I/F 114 of the printer board 2 or to the printer interface 110 of the main controller 1, via the selector 121 over the signal line 118 connected to the selector 121. Whether a signal is transferred to which printer I/F from the selector 121 is controlled by the main controller 1.

Specifically, when the relay IC 109 receives the PRNT signal, this effect is notified to CPU 108 via the CPU bus. The corresponding control signal is therefore supplied from CPU 108 to the selector 121 via the printer I/F 110 and a signal line 119. In response to this, the selector 121 is switched to the printer board 2 side. The signal path of the selector 121 is generally set so that it receives image data from the printer I/F 110 of the main controller 1 and sends it to the engine controller 3.

After the PRNT signal is supplied from the relay IC 109 to the engine controller 3 (step S106), the engine controller 3 adjusts the temperature of a fixing unit and thereafter feeds a record sheet to start the print process (step S107).

When the vertical sync signal is supplied from the engine controller 3 to the printer I/F 114 of the printer board 2 via the selector 121, the printer board 2 counts the vertical margin time. Each time the vertical sync signal is supplied, the vertical margin time is increased by "1". When a predetermined value is counted up, the vertical margin time count is terminated. When the next horizontal sync signal is supplied, a predetermined time is counted by using internal clocks to set a horizontal margin. After this horizontal margin is set, transfer of an image signal starts. The image signal is represented by a high level (hereinafter called an "H" level") for a black pixel, and by a low level (hereinafter called an "L" level") for a white pixel. In this embodiment, H is represented by a signal of +5 V, and L is represented by a signal of 0 V. In accordance with the image signal, a laser beam is controlled to be turned on and off and at the same time, controls of development, fixing, charging, record sheet ejecting and the like are executed. After image signals of one line are transferred, the operation stands by until the next horizontal sync signal. This operation is repeated until the print process of one page is completed.

After the image signals of all lines of one page are transferred, it is checked whether there is print data of the next page (step S108). If there is print data of the next page, the PRINT signal is again sent to start the print process of the next page. If there is no print data of the next page, a process of terminating the print process is executed (step S109) to terminate the print process. After the print process completion, a selector signal is supplied from CPU 108 to the selector 121 via the printer I/F 110. In response to this, the selector 121 is recovered to the main controller 1 side (step S110).

If a digital copy or a facsimile print is to be performed, the printer I/F 110 of the main controller 1 and the engine controller 3 can directly transfer a control signal therebetween. For example, in the digital copy, image data of an original read with the reader 103 is supplied via the reader I/F 106 to the image processor 107 which processes the image data and temporarily stores it in RAM 122. Thereafter, after the control signal is transferred between the printer I/F 110 of the main controller 1 and the engine controller 3, the stored image data is transferred to the engine controller 3 to start the print process. In the case of the facsimile print, signals transferred from the telephone line via NCU 126 are received by the modem 112 and temporarily stored in RAM 122. Thereafter, after the control signal is transferred between the printer I/F 110 of the main controller 1 and the engine controller 3, the facsimile encoded data is converted into binary image data by the codec 113 and transferred to the engine controller 3 to start the print process.

Transfer of a status or command to and from the printer board 2 to be executed by CPU 108 will be described.

Prior to outputting the video signal, the printer board 2 outputs a print request command called a "Job start request" from P13. In response to this print request command, CPU 108 does not supply this command to the engine controller if the composite apparatus is outputting the video signal, but it supplies an engine busy signal to the printer board 2. If the composite apparatus is not outputting the video signal to the engine controller 3, CPU 108 switches the selector 121 to the printer board 2 side and returns the "Job start accepted" command representative of a status that an image signal can be output, to the printer board 2 without outputting the print request command to the engine controller. After a use privilege of the printer engine is passed to the printer board 2, CPU 108 directly passes transfer of a status between the printer board 2 and engine controller 3.

When the printer engine 4 notifies a full state of the paper ejection port 4-3 to CPU 108 via the engine controller 3, CPU 108 checks a value set in RAM 122 to judge the settings of the paper ejection ports. If the "sharing setting" is set, CPU 108 notifies a status of "paper ejection port 4-1: empty, paper ejection port 4-2: empty, paper ejection port 4-3: full". If the printer board 2 designates a paper ejection port change, CPU 108 notifies this paper ejection port change to the engine controller 3. If the "individual setting" is set, CPU 108 changes the status from the engine controller 3 to a status "paper ejection port 4-3: full" and notifies it to the printer board 2 to make the printer board 2 visible only one paper ejection port.

As described above, according to the embodiment, an already developed printer board for a general printer can be used in printing image data supplied from an external computer at a composite apparatus. The printer can be shared in executing any one of the digital copy function, a facsimile function and a print function. Of signals supplied from the printer board 2, specific signals, particularly high speed signals, can be supplied directly to the engine controller 3 without using the relay IC 109, through direct connection of the printer board 2 and engine controller 3 via the signal lines 118. A signal delay can therefore be alleviated.

A printer applied to this embodiment is not limited to a laser beam printer and an ink jet printer, but it is obvious that printers of other types can be used.

It is obvious that the composite apparatus may be a single apparatus, a system constituted of a plurality of apparatuses, or a system using a network such as a LAN, so long as it can realize the functions of the invention.

It is obvious that the object of the invention can be achieved by supplying a composite apparatus or a composite system with a storage medium storing software program codes realizing the functions of the embodiment described above, and by reading and executing the programs codes stored in the storage medium by a computer (CPU or MPU) of the composite apparatus or composite system.

In such a case, the program codes themselves read from the storage medium realize the functions of the embodiment. Therefore, the storage medium storing such program codes constitutes the present invention.

The storage medium for storing such program codes may be a floppy disk, a hard disk, an optical disk, a magnetooptical disk, a CD-ROM, a CD-R, a magnetic tape, a nonvolatile memory card, a ROM or the like.

It is obvious that the scope of the invention also contains not only the case wherein the functions of the embodiment can be realized by executing the program codes read by a computer, but also the case wherein the functions of the embodiment can be realized by executing a portion or the whole of processes by an OS or the like running on the computer, in accordance with the program codes.

It is obvious that the scope of the invention also contains the case wherein the functions of the embodiment can be realized by writing the program codes read from the storage medium into a memory of a function expansion board inserted into a computer or of a function expansion unit connected to the computer, and thereafter by executing a portion or the whole of actual processes by a CPU of the function expansion board or function expansion unit.

As many apparently widely different embodiments of the present invention can be made without departing from the spirit and scope thereof, it is to be understood that the invention is not limited to the specific embodiments thereof except as defined in the appended claims.

As described so far, according to the present invention, in printing image data supplied from an external computer via a printer board, predetermined high speed signals are supplied from the printer board to the engine controller without using the relay of the main controller and predetermined signals other than high speed signals are supplied from the printer board to the engine controller via the relay. In printing image data supplied from the main controller, the predetermined high speed signals and the predetermined signals other than the high speed signals are supplied from the main controller to the engine controller without using the relay. In this manner, a signal path to the engine controller is changed. Accordingly, not a printer board newly developed for the composite apparatus, but an already developed printer board for a general printer can be used in printing image data supplied from an external computer at the composite apparatus. It is therefore possible to suppress an increase in product cost.

What is claimed is:

1. A composite apparatus having a print function and being connectable to a printer board for receiving print data from an external host computer and generating image data, comprising:

main control means for controlling an entirety of the composite apparatus;

print engine control means for controlling a print engine which prints image data supplied from the external computer via the printer board or image data supplied from said control means; and connection means for connecting said composite apparatus to the printer board, wherein said connection means comprises:

relay means provided between said main control means and the printer board for relaying, via a CPU bus, one portion of signals to be exchanged between the printer board said print engine control means; and selector means provided between said print engine control means and the printer board for directly relaying, without intervention of the CPU bus, the other portion of the signals to be exchanged between the printer board and said print engine control means, wherein said selector means directly relays signals without using said relay means or the CPU bus, if the signals are predetermined high speed signals to be exchanged between the printer board and said print engine control means, and relays signals via said relay means and the CPU bus, if the signals are other than the predetermined high speed signals.

2. A composite apparatus according to claim 1, wherein during a period while image data from said control means is printed by the print engine, a signal is supplied from said control means to the printer board, the signal representing that a print process by the print engine is not possible.

3. A composite apparatus according to claim 2, wherein said main control means acquires a status of said print engine control means in response to a status request supplied from the printer board via said relay means, changes the acquired status to information capable of being analyzed by the printer board, and returns the information to the printer board.

4. A composite apparatus according to claim 1, wherein the predetermined high speed signals include a vertical sync signal, a horizontal sync signal and an image signal.

5. A printer sharing method for a composite apparatus having a print function and being connectable to a printer board for receiving print data from an external host computer and generating image data, comprising:

a main control step of controlling, using a main controller, an entirety of the composite apparatus;

a print engine control step of controlling, using a print engine controller, a print engine which prints image data supplied from the external computer via the printer board or image data supplied from the main controller; and a connecting step of connecting the composite apparatus to the printer board, wherein said connecting step comprises:

a relay step of relaying, via a CPU bus, one portion of signals to be exchanged between the printer board and the print engine controller; and a selecting step of selecting and directly relaying, without intervention of the CPU bus, the other portion of the signals exchanged between the printer board and the print engine controller, wherein said selecting step directly relays signals without using said relaying step or the CPU bus, if the signals are predetermined high speed signals to be exchanged between the printer board and said print engine controller, and relays signals in said relaying step via the CPU bus, if the signals other than the predetermined high speed signals.

6. A printer sharing method for a composite apparatus according to claim 5, wherein during a period while image data at said main control step is printed at the print engine, a signal is supplied at said main control step to the printer board, the signal representing that a print process by the print engine is not possible.

7. A printer sharing method for a composite apparatus according to claim 6, wherein said control step acquires a status during said print engine control step in response to a status request supplied from the printer board by said relay step, changes the acquired status to information capable of being analyzed by the printer board, and returns the information to the printer board.

8. A printer sharing method for a composite apparatus according to claim 5, wherein the predetermined high speed signals include a vertical sync signal, a horizontal sync signal and an image signal.

* * * * *